US012803144B2

(12) United States Patent
Wang et al.

(10) Patent No.: US 12,803,144 B2
(45) Date of Patent: Nov. 17, 2026

(54) RESONATOR AND FILTER

(71) Applicant: Suzhou Luxshare Technology Co., Ltd., Suzhou City (CN)

(72) Inventors: Wei Wang, Suzhou City (CN); Jiasheng Yu, Suzhou City (CN); Xiang Xiao, Suzhou City (CN); Xinghua Sun, Suzhou City (CN)

(73) Assignee: SUZHOU LUXSHARE TECHNOLOGY CO., LTD., Suzhou City (CN)

(*) Notice: Subject to any disclaimer, the term of this patent is extended or adjusted under 35 U.S.C. 154(b) by 8 days.

(21) Appl. No.: 19/231,128

(22) Filed: Jun. 6, 2025

(65) Prior Publication Data

US 2025/0385414 A1 Dec. 18, 2025

(30) Foreign Application Priority Data

Jun. 18, 2024 (CN) ........................ 202410788610.6

(51) Int. Cl.

| | |
|---|---|
| ***H01P 1/208*** | (2006.01) |
| ***F16B 1/00*** | (2006.01) |
| ***F16B 9/00*** | (2006.01) |
| ***H01P 7/06*** | (2006.01) |

(52) U.S. Cl.
CPC ................ *H01P 1/208* (2013.01); *F16B 1/00* (2013.01); *F16B 9/00* (2013.01); *H01P 7/06* (2013.01); *Y10T 24/00* (2015.01)

(58) Field of Classification Search
CPC .... H01P 1/208; H01P 7/06; F16B 1/00; F16B 9/00; Y10T 24/00
USPC .............................. 333/202, 206, 209; 411/1
See application file for complete search history.

(56) References Cited

U.S. PATENT DOCUMENTS

2014/0333394 A1* 11/2014 Chong ..................... H01P 7/04 333/222

FOREIGN PATENT DOCUMENTS

| | | |
|---|---|---|
| CN | 219959385 U | 11/2023 |
| CN | 220233423 U | 12/2023 |
| CN | 220797052 U | 4/2024 |

* cited by examiner

*Primary Examiner* — Andrea Lindgren Baltzell
*Assistant Examiner* — Victor Cole
(74) *Attorney, Agent, or Firm* — Birch, Stewart, Kolasch & Birch, LLP

(57) ABSTRACT

Embodiments of the present disclosure disclose a filter and a resonator including a housing, a cover plate, a resonant rod, and fixing members. The housing has a resonant cavity. The cover plate is connected to the housing. The resonant rod is disposed within the resonant cavity. The resonant rod includes a main body and connecting lugs arranged on the outer side of the main body. The main body has an inner cavity. Each connecting lug is provided with a connecting through-hole. Threaded holes are formed at the bottom of the resonant cavity. Fixing members passes through the connecting through-hole and extends into the threaded holes to connect the resonant rod to the housing. The connecting lugs position the fixing members outside the inner cavity, reserving sufficient space for the inner cavity, ensuring ample adjustment space during tuning of the resonator, improving its safety, and effectively reducing tuning power consumption.

16 Claims, 7 Drawing Sheets

RESONATOR AND FILTER

CLAIM OF PRIORITY AND CROSS-REFERENCE TO RELATED APPLICATION(S)

This application claims the benefit of Chinese Patent Application No. 202410788610.6, filed on Jun. 18, 2024, which is incorporated herein by reference in its entirety.

BACKGROUND OF THE DISCLOSURE

1. Field of the Disclosure

The present disclosure relates to the field of communication equipment technology, and particularly to a resonator and a filter.

2. Description of the Related Art

Cavity filters, as critical communication devices, play an irreplaceable role in radio transmission. A cavity filter typically comprises a cavity and a resonant rod. The cavity is provided with multiple resonant cavities, each containing a resonant rod. Currently, in cavity filters, the resonant rod has a through-hole at its bottom, and a fixing screw passes through the through-hole to secure the resonant rod to a support base within the resonant cavity.

BRIEF DESCRIPTION OF THE DISCLOSURE

In view of this, the present disclosure provides a resonator and a filter that increase the tuning space of the resonant rod, effectively enhance the safety of the resonator, and improve overall product performance.

According to first aspect of the present disclosure, there is provided a resonator, comprising: a housing, internally provided with a resonant cavity with an upward opening, the bottom of the resonant cavity having threaded holes; a cover plate, covering the opening of the resonant cavity and connected to the housing; a resonant rod, disposed within the resonant cavity, the resonant rod comprising a main body and at least two connecting lugs, the connecting lugs being arranged on an outer side of the main body, each connecting lug being provided with a connecting through-hole, the main body having an inner cavity with an upward opening; and fixing members, passing through the connecting through-holes and engaging with the threaded holes to connect the resonant rod to the housing.

Further, all the connecting lugs are arranged at equal angles around a central axis of the main body.

Further, the main body is provided with an annular protrusion at its bottom, the annular protrusion being in close contact with a surface of the resonant cavity.

Further, the resonant cavity has a raised platform at its bottom, the annular protrusion being pressed against an upper surface of the raised platform.

Further, the resonant cavity is further provided with fixing platforms at its bottom, the number of fixing platforms corresponding to the number of connecting lugs, the fixing platforms and the connecting lugs being positionally aligned therewith, the threaded holes being disposed inside the fixing platforms, the connecting lugs resting on an upper surface of the fixing platforms, and the fixing members passing through the connecting through-holes and extending into the threaded holes.

Further, the resonator comprising a tuning screw and a nut, the tuning screw passing through the cover plate and extending into the resonant cavity and the inner cavity, the nut being located outside the cover plate and connected to the tuning screw.

According to second aspect of the present disclosure, there is provided a filter, comprising a top cover and at least one resonator according to first aspect, the top cover being located above the cover plate and sealingly connected to the housing.

Further, the filter is provided with at least one resonant unit, each resonant unit comprising multiple resonators arranged in a single row or multiple rows; wherein the housings of all the resonators are integrally formed to constitute a casing of the filter.

Further, each resonant unit comprises an input structure and an output structure connected to external components, one end of a row of resonators is provided with an input isolation cavity and the other end is provided with an output isolation cavity, a first slit is formed on a wall of the input isolation cavity and a second slit is formed on a wall of the output isolation cavity, the input structure passes through the input isolation cavity and extends into an adjacent resonant cavity via the first slit, the output structure passes through the output isolation cavity and extends into an adjacent resonant cavity via the second slit.

Further, the resonators of the resonant unit are arranged in multiple rows, with a resonator in an upper row being located between two adjacent resonators in a lower row, a coupling window and/or a coupling assembly is provided on a wall of each resonant cavity.

Embodiments of the present disclosure provide a resonator and a filter. The resonator includes a housing, a cover plate, a resonant rod, and a fixing member. The housing has a resonant cavity with an upward opening. The cover plate covers the opening and is connected to the housing. The resonant rod, disposed in the resonant cavity, includes a main body with an inner cavity with an upward opening and connecting lugs on its outer side. The fixing member passes through connecting through-holes in the connecting lugs and engages with threaded holes in the resonant cavity to secure the resonant rod. Positioning the fixing member outside the inner cavity via the connecting lugs reserves ample space for tuning, enhances safety, and reduces tuning power consumption.

BRIEF DESCRIPTION OF THE DRAWINGS

The above and other objectives, features, and advantages of the present disclosure will become clearer through the following description of embodiments with reference to the accompanying drawings. In the drawings.

DETAILED DESCRIPTION OF EMBODIMENTS OF THE DISCLOSURE

The following describes the present application based on embodiments, but the present application is not limited to these embodiments. In the detailed description of the present application below, some specific details are described exhaustively. A person skilled in the art can fully understand the present application even without the description of these details. To avoid obscuring the essence of the present application, well-known methods, procedures, processes, components, and circuits are not described in detail.

Furthermore, it should be understood by those of ordinary skill in the art that the accompanying drawings provided herein are for illustrative purposes, and the drawings are not necessarily drawn to scale.

Unless otherwise explicitly specified and defined, terms such as "mount," "connect," "attach," and "fix" should be interpreted broadly. For example, a connection may be a fixed connection, a detachable connection, or an integral connection; it may be a mechanical connection, an electrical connection, or a direct connection; it may be an indirect connection through an intermediate medium, or an internal connection or interaction between two components. Those of ordinary skill in the art can understand the specific meanings of the above terms in the present application based on specific circumstances.

Unless the context explicitly requires otherwise, the terms "include," "comprise," and similar terms throughout the application documents may be interpreted as inclusive rather than exclusive or exhaustive; that is, they mean "including but not limited to."

In the description of the present application, it should be understood that terms such as "first" and "second" are used for descriptive purposes only and should not be construed as indicating or implying relative importance. Additionally, in the description of the present application, unless otherwise specified, "plurality" means two or more.

For existing cavity filters, when considering the height of the support base, the thickness of the resonant rod, and the thickness of the screw head, the distance between the tuning screw and the locking surface of the resonant rod becomes relatively short. During frequency adjustment, this may cause the tuning screw to "back out" (i.e., the tuning screw cannot be further tightened due to insufficient distance), thereby degrading product performance. Alternatively, it may lead to over-insertion ("over-depth") of the tuning screw, causing unintended contact with other components, resulting in short circuits or sparks. These issues not only impair product functionality but also pose safety risks to users. The lack of consistency in product assembly further compromises quality and performance.

Figure 3:
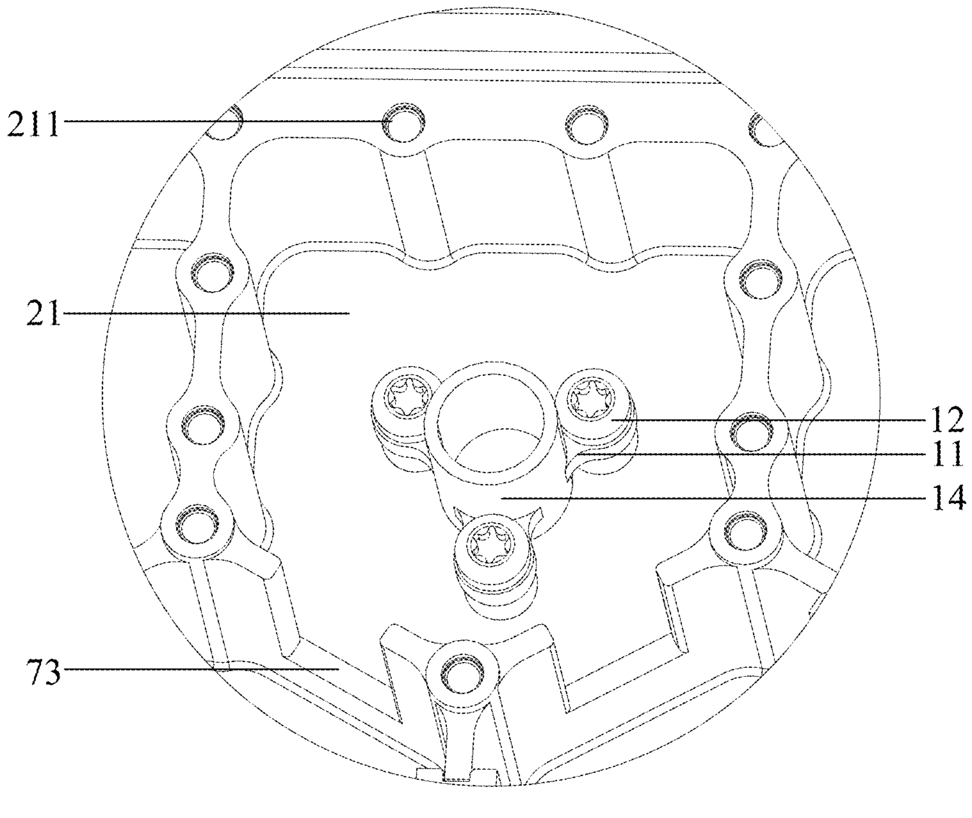
FIG. 3 is a schematic diagram of the internal structure of a resonator according to the embodiment of the present disclosure.
Figure 5:
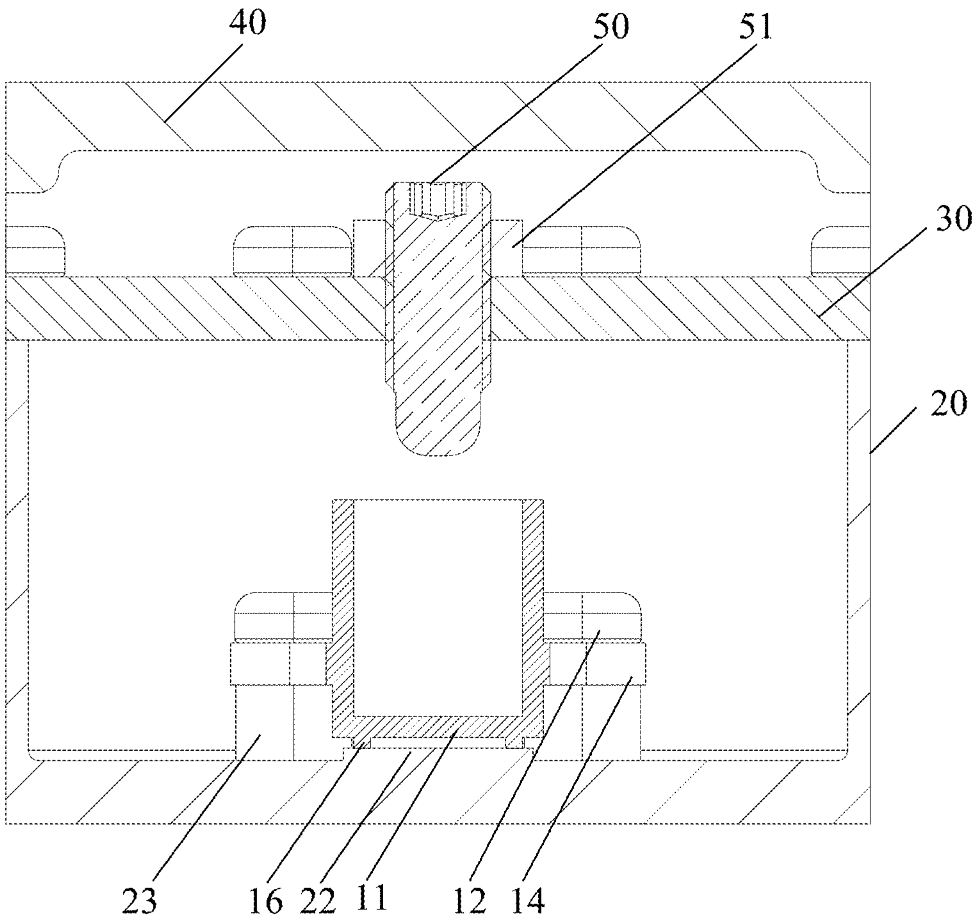
FIG. 5 is a cross-sectional view of the resonator according to the embodiment of the present disclosure.

The embodiments of the present application provide a resonator. FIG. 3 is a schematic diagram of the internal structure of the resonator according to the embodiment, and FIG. 5 is a cross-sectional view of the resonator according to the embodiment. Referring to FIG. 5, the resonator of this embodiment includes a housing 20, a cover plate 30, and a resonant rod 10. The housing 20 has a resonant cavity 21 with an upward opening inside. The resonant rod 10 is disposed in the resonant cavity 21, and the cover plate 30 covers the opening of the resonant cavity 21 and is connected to the housing 20. Referring to FIG. 3, the resonant rod 10 includes a main body 11 and at least two connecting lugs 14. The connecting lugs 14 are provided with connecting through-holes 15. The connecting lugs 14 are disposed on the outer side of the main body 11, and the lower surfaces of the connecting lugs 14 contact the bottom of the resonant cavity 21. The bottom of the resonant cavity 21 is further provided with threaded holes 231. Fixing members 12 pass through the connecting through-holes 15 and extend into the threaded holes 231 to fixedly connect the resonant rod 10 to the housing 20. The fixing members 12 are connected to the outer side of the main body 11 through the connecting lugs 14, which effectively reduces the power consumption of the resonator. At the same time, sufficient tuning space is reserved between the resonant rod 10 and the tuning screw 50, ensuring stability and safety during tuning. Optionally, the fixing members 12 in this embodiment may be bolts, screws, studs, or similar structures.

Figure 4:
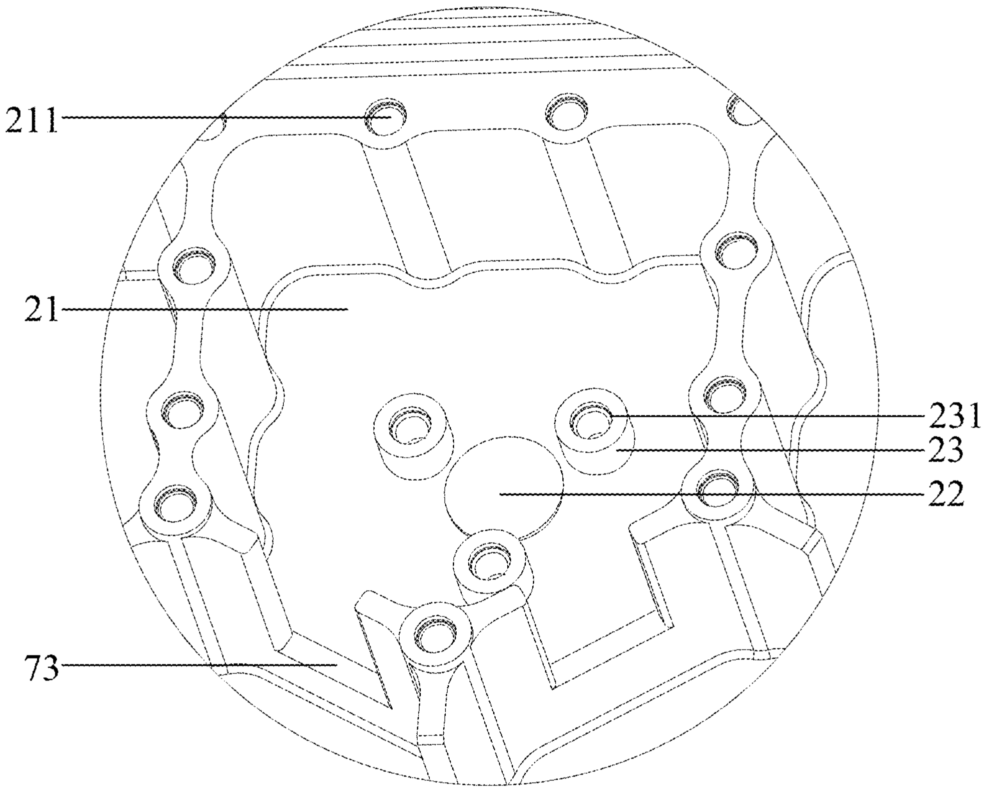
FIG. 4 is a schematic diagram of the housing structure of the resonator according to the embodiment of the present disclosure.
Figure 6:
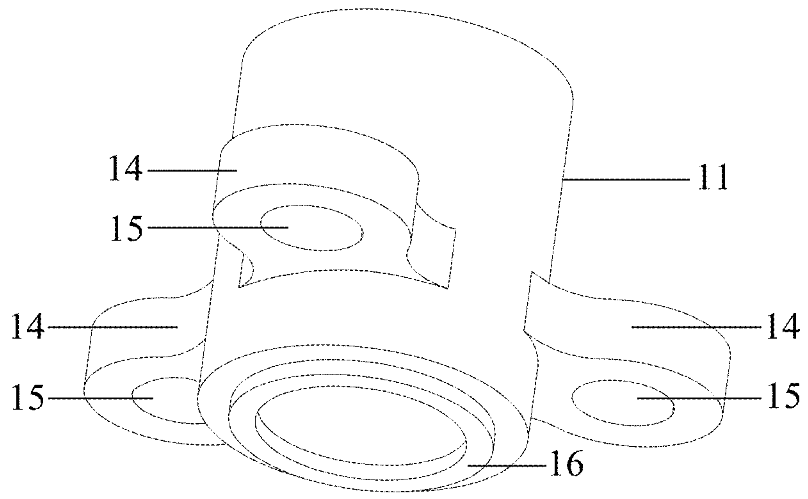
FIG. 6 is a first schematic diagram of the main body structure of a resonant rod according to the embodiment of the present disclosure.
Figure 7:
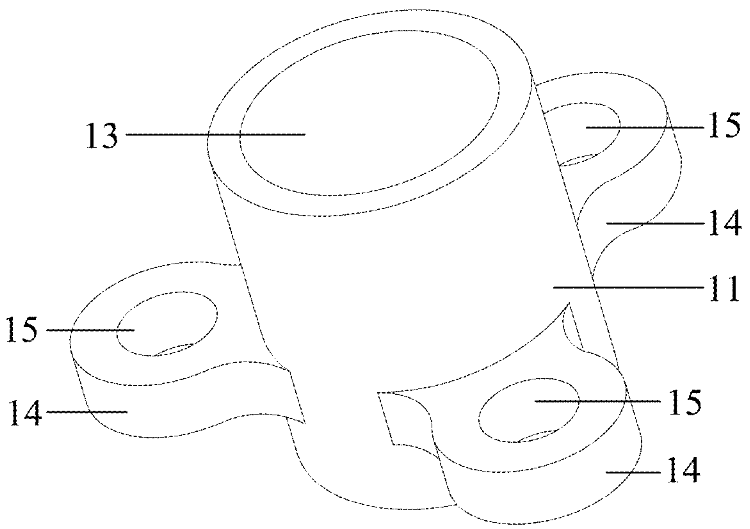
FIG. 7 is a second schematic diagram of the main body structure of the resonant rod according to the embodiment of the present disclosure.

FIG. 6 and FIG. 7 are specific schematic diagrams of the resonant rod according to the embodiment. Referring to FIG. 6 and FIG. 7, the main body 11 of the resonant rod 10 is cylindrical, and the main body 11 has an inner cavity 13 with an upward opening. The connecting lugs 14 are disposed on the outer side of the main body 11, ensuring that the fixing members 12 are located outside the inner cavity 13 during installation, thereby fully preserving the tuning space of the inner cavity 13. Referring to FIG. 4, the bottom of the resonant cavity 21 is further provided with fixing platforms 23. The number of fixing platforms 23 corresponds to the number of connecting lugs 14, and their positions mutually correspond. The threaded holes 231 are disposed within the fixing platforms 23. When the resonant rod 10 is connected to the resonant cavity 21, the connecting lugs 14 rest on the upper surfaces of the fixing platforms 23, and the fixing members 12 pass through the connecting through-holes 15 and extend into the threaded holes 231. All connecting lugs 14 are distributed at equal angles around the central axis of the main body 11. In other words, two or more connecting lugs 14 are uniformly distributed around the periphery of the main body 11. The uniformly distributed connecting lugs 14 ensure the stability of the resonant rod 10, reduce wave scattering within the resonant cavity 21, and ensure symmetry and stability during tuning.

Optionally, the shape of the connecting lugs 14 may be circular, square, or other shapes that can connect to the main body 11.

In another feasible embodiment, an annular connecting lug 14 is disposed on the outer side of the main body 11. The annular connecting lug 14 surrounds the main body 11 and is provided with at least two connecting through-holes 15. The connecting through-holes 15 are distributed at equal angles around the central axis of the main body 11. The annular connecting lug 14 ensures that the resonant rod 10 is subjected to more uniform forces and is installed more stably, effectively guaranteeing stability during tuning.

Referring to FIG. 6 and FIG. 7, the bottom of the main body 11 is further provided with an annular protrusion 16, which improves intermodulation frequency performance. When the resonant rod 10 is fixedly installed in the resonant cavity 21, the annular protrusion 16 conforms to the surface of the resonant cavity 21, ensuring stable contact between the resonant rod 10 and the resonant cavity 21. The annular protrusion 16 may act as an intermodulation ring by adjusting the electromagnetic field distribution to enhance frequency stability and improve signal purity. The conformity between the annular protrusion 16 and the resonant cavity 21 ensures tuning stability, allowing the resonator to operate stably in complex environments. Optionally, the annular protrusion 16 may be circular, square, or another annular shape.

Referring to FIG. 4, the bottom of the resonant cavity 21 is further provided with raised platforms 22, which are disposed between the fixing platforms 23. Referring to FIG. 5, when the resonant rod 10 is installed in the resonant cavity 21, the annular protrusion 16 presses against the upper surfaces of the raised platforms 22. The shape of the raised platforms 22 matches the shape of the annular protrusion 16, and the size of the raised platforms 22 is greater than or equal to the size of the annular protrusion 16, ensuring full contact between the raised platforms 22 and the annular protrusion 16 when the resonant rod 10 is placed on the raised platforms 22. When there are height differences between the fixing platforms 23 and/or the connecting lugs 14, gaps may easily form between the annular protrusion 16 and the resonant cavity 21. The raised platforms 22 may compensate for certain height differences, ensuring full contact between the annular protrusion 16 and the resonant cavity 21 and guaranteeing stable installation of the resonant rod 10. Additionally, the interaction between the raised platforms 22 and the annular protrusion 16 further enhances the tuning performance of the annular protrusion 16, thereby improving signal purity.

Referring to FIG. 5, the resonator further includes a tuning screw 50 and a nut 51. The tuning screw 50 passes through the cover plate 30, extends into the resonant cavity 21, and enters the inner cavity 13. The nut 51 is located on the outer side of the cover plate 30 and is connected to the tuning screw 50. The tuning screw 50 is threadedly connected to the cover plate 30 and passes through the cover plate 30 into the resonant cavity 21 or into the inner cavity 13 of the resonant rod 10 through the resonant cavity 21. By adjusting the depth to which the tuning screw 50 extends into the resonant cavity 21 or the inner cavity 13, the coupling amount may be adjusted to meet required specifications. The tuning screw 50 is made of a metal-plated material. Specifically, the tuning screw 50 may be made of silver-plated or copper-plated components. The tuning screw 50 is conductively connected to the cover plate 30. The portion of the tuning screw 50 extending into the resonant cavity 21 or the inner cavity 13 forms capacitive coupling with the tuning screw 50 itself. Thus, the resonator may adjust the resonant frequency by altering the depth of the tuning screw 50 in the resonant cavity 21 to change the coupling capacitance.

The resonator in the embodiments of the present application reduces energy consumption by arranging the connecting lugs 14 on the outer side of the main body 11 of the resonant rod 10, positioning the fixing members 12 outside the inner cavity 13. This allows the resonator to adapt to harsh environments. At the same time, placing the fixing members 12 outside the inner cavity 13 reserves sufficient tuning space for the tuning screw 50, enabling precise frequency adjustment while ensuring stability and safety during tuning.

Figure 1:
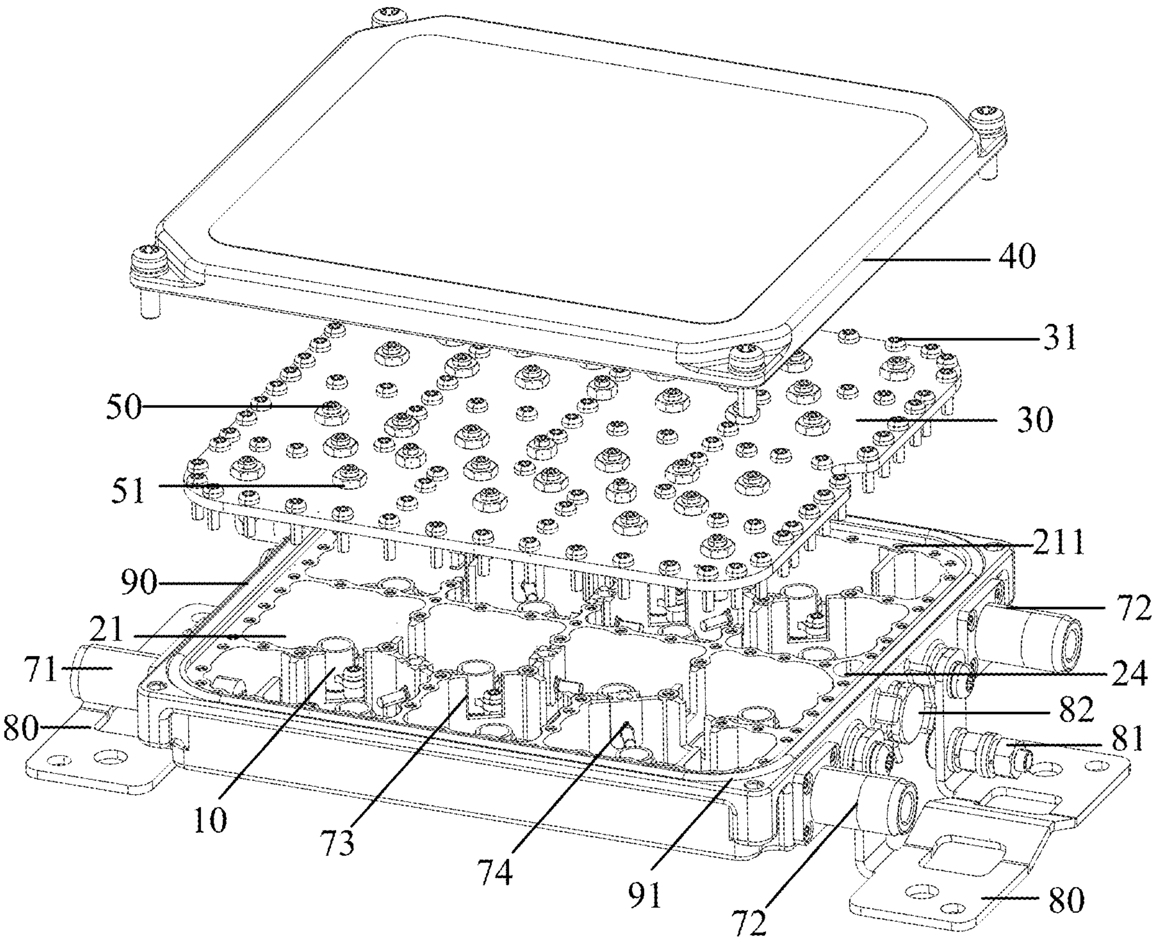
FIG. 1 is an exploded view of a filter according to an embodiment of the present disclosure.

The embodiments of the present application further provide a filter. FIG. 1 is an exploded view of the filter according to the embodiment. Referring to FIG. 1, the filter includes a top cover 40 and at least one resonator described in the above embodiments. The top cover 40 is located above the cover plate 30 of the resonator and is sealingly connected to the housing 20. The sealed connection helps maintain the stability of the internal structure of the filter and prevents external contaminants from entering, which could degrade performance.

Figure 2:
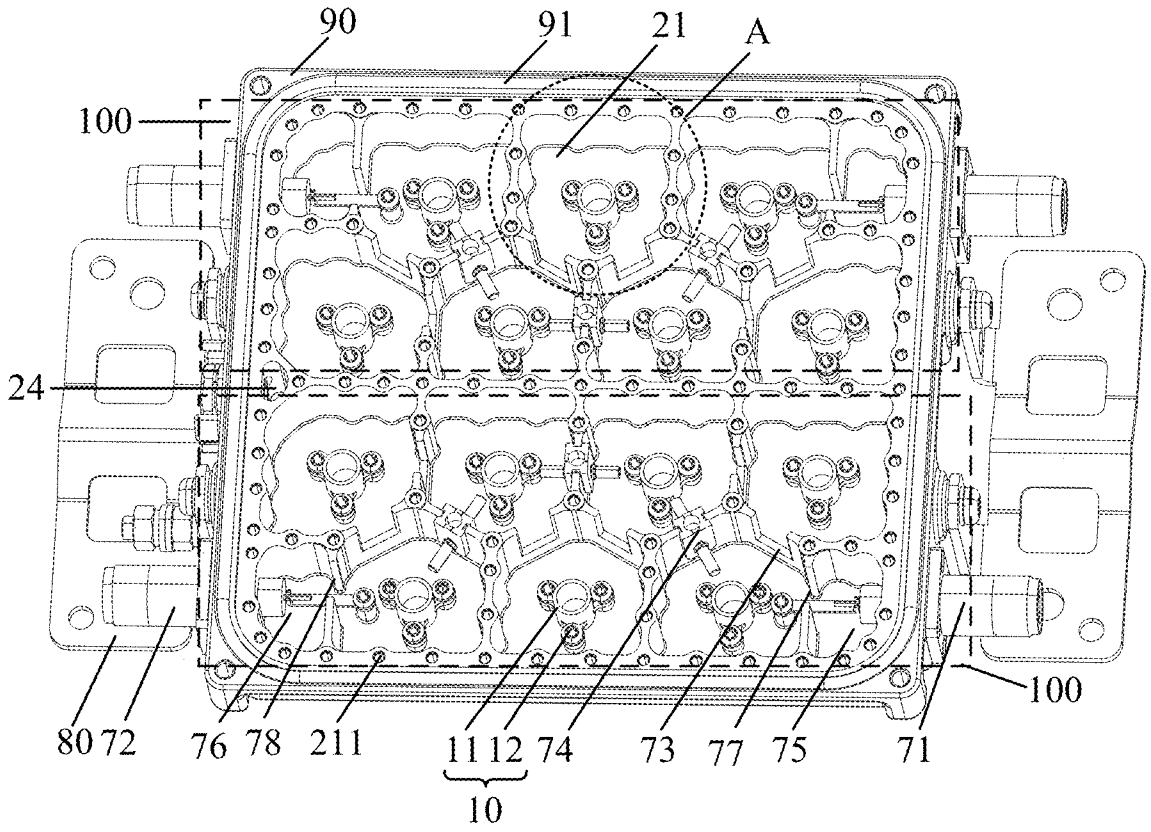
FIG. 2 is a schematic diagram of the internal structure of the housing of the filter according to the embodiment of the present disclosure.

Referring to FIG. 1 and FIG. 2, the filter is provided with at least one resonant unit 100. Each resonant unit 100 includes multiple resonators arranged in a single row or multiple rows. It is understandable that the number and arrangement of resonators may be adjusted according to different requirements.

The filter in this embodiment includes multiple resonators as described in the above embodiments. Referring to FIG. 1 and FIG. 2, the housings 20 of all resonators are integrally formed to create the casing 90 of the filter. The casing 90 is divided into multiple resonant cavities 21, each of which is centrally installed with a resonant rod 10. The resonant rod 10 is fixed to the bottom of the resonant cavity 21 via the fixing members 12. The fixing members 12 are disposed outside the inner cavity 13 through the connecting lugs 14, and the fixing platforms 23 at the bottom of the resonant cavity 21 correspond to the connecting lugs 14. The fixing members 12 and fixing platforms 23 are located outside the main body 11, ensuring sufficient tuning space between the tuning screw 50 and the inner cavity 13, thereby guaranteeing safety and stability during tuning.

Figure 8:
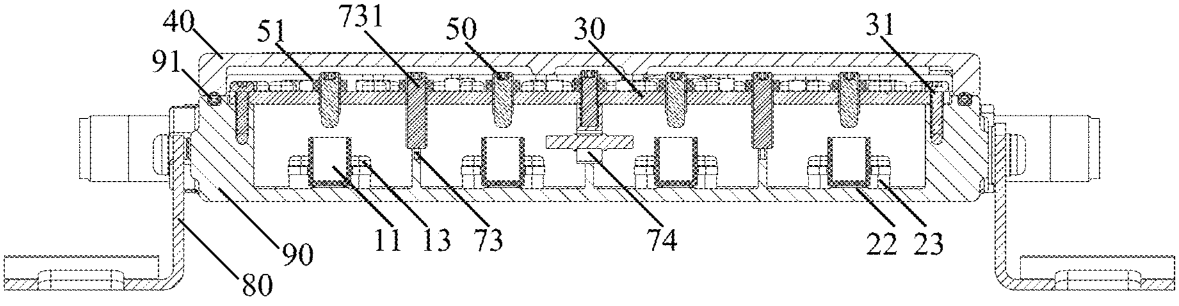
FIG. 8 is a cross-sectional view of the filter according to the embodiment of the present disclosure.

Referring to FIG. 1 and FIG. 8, the cover plate 30 covers all the openings of the resonant cavities 21 to seal them. Referring to FIGS. 2-4, the upper surface of the casing 90 is provided with multiple mounting holes 211 around the resonant cavities 21. Referring to FIG. 1 and FIG. 8, mounting screws 31 pass through the cover plate 30 and extend into the mounting holes 211 to fixedly install the cover plate 30 to the casing 90.

Referring to FIG. 1 and FIG. 8, the casing 90 is larger in size than the cover plate 30. The inner side of the casing 90 is recessed downward to engage with the cover plate 30, facilitating positioning and installation. The casing 90 is generally rectangular, and the top cover 40 matches the shape of the casing 90. The casing 90 and the top cover 40 are connected and fixed at four corners via fasteners. The outer side of the upper surface of the casing 90 is surrounded by a sealing strip 91. When the top cover 40 is closed onto the casing 90, the sealing strip 91 is compressed to fully conform between the top cover 40 and the casing 90, achieving an effective seal. The side of the top cover 40 near the cover plate 30 is provided with a clearance groove to avoid collisions with the nuts 51 and tuning screws 50 above the cover plate 30 during installation.

Referring to FIG. 2, each resonant unit 100 includes an input structure 71 and an output structure 72 connected to external components for receiving and transmitting signals. At both ends of one row of resonators in each resonant unit 100, an input isolation cavity 75 and an output isolation cavity 76 are provided. The cavity wall of the input isolation cavity 75 is provided with a first slit 77, and the cavity wall of the output isolation cavity 76 is provided with a second slit 78. The input structure 71 passes through the input isolation cavity 75 and extends into the adjacent resonant cavity 21 via the first slit 77. The output structure 72 passes through the output isolation cavity 76 and extends into the adjacent resonant cavity 21 via the second slit 78. The input isolation cavity 75 and output isolation cavity 76 isolate the influence of the input structure 71 and output structure 72 on the resonant cavities 21, reduce interference, optimize signal transmission, and enhance the overall stability and reliability of the filter.

In the resonant unit 100 of this embodiment, the resonators are arranged in multiple rows. Referring to FIG. 2, the resonators in the upper row are located between adjacent resonators in the lower row. The cavity walls of each resonant cavity 21 are provided with coupling windows 73 and/or coupling assemblies 74. Multiple coupling assemblies 74 are arranged from one end of the resonant unit 100 along a specific path to guide the propagation direction of frequency signals, enabling precise frequency adjustment and signal transmission. The starting ends of the coupling assemblies 74 are set on the cavity wall of the resonant cavity 21 connected to the input structure 71, and the terminal ends are set on the cavity wall of the resonant cavity 21 connected to the output structure 72, forming a continuous signal transmission path. A coupling screw 731 is disposed above the coupling window 73. The coupling screw 731 passes through the cover plate 30 and extends into the resonant cavity 21. By adjusting the depth of the coupling screw 731 in the resonant cavity 21, the size of the coupling window 73 may be controlled, thereby improving precision in signal frequency adjustment.

Additionally, the coupling assemblies 74 are detachably connected to the casing 90. Both sides of the coupling assemblies 74 are provided with sliding grooves to engage with the coupling windows 73. Therefore, the coupling path formed by multiple coupling assemblies 74 may be adjusted according to specific requirements.

Referring to FIG. 1 and FIG. 2, the housing 20 is symmetrically provided with support structures 80 on its outer side, i.e., the casing 90 is provided with support structures 80 to provide stable support and fixation for the filter. The support structures 80 are connected to grounding screws 81, which help control and guide interference currents. Optionally, the support structures 80 may also be provided with mounting interfaces such as screw holes, clasps, or quick-lock devices to accommodate different installation requirements.

Referring to FIG. 1 and FIG. 2, the housing 20 is further provided with a ventilation valve 82 on its outer side. A ventilation cavity 24 is disposed on one side inside the housing 20, and the ventilation valve 82 passes through the housing 20 to communicate with the ventilation cavity 24. The ventilation cavity 24 accommodates the ventilation valve 82 and provides a pressure-balancing space. The ventilation valve 82 allows air or gas to flow when internal and external pressure changes occur, while preventing contaminants such as dust and moisture from entering the filter, ensuring normal operation.

The filter provided in this embodiment includes at least one resonator. The resonant rods 10 in the resonators are fixed via connecting lugs 14 on the outer side of the main body 11, positioning the fixing members 12 outside the inner cavity 13. This effectively reduces the overall power consumption of the filter. Simultaneously, the fixing platforms 23 at the bottom of the resonant cavities 21 correspond to the connecting lugs 14, reserving sufficient adjustment space between the tuning screws and the inner cavity 13 of the resonant rods 10. This enhances the filter's reliability, stability, and space utilization efficiency.

The above descriptions are merely preferred embodiments of the present application and are not intended to limit the present application. For those skilled in the art, various modifications and variations can be made to the present application. Any modifications, equivalent substitutions, or improvements made within the spirit and principles of the present application shall be included within the scope of protection of the present application.

We claim:

1. A resonator, comprising:

a housing (20), internally provided with a resonant cavity (21) with an upward opening, the bottom of the resonant cavity (21) having threaded holes (231);

a cover plate (30), covering the opening of the resonant cavity (21) and connected to the housing (20);

a resonant rod (10), disposed within the resonant cavity (21), the resonant rod (10) comprising a main body (11) and at least two connecting lugs (14), the connecting lugs (14) being arranged on an outer side of the main body (11), each connecting lug (14) being provided with a connecting through-hole (15), the main body (11) having an inner cavity (13) with an upward opening; and fixing members (12), passing through the connecting through-holes (15) and engaging with the threaded holes (231) to connect the resonant rod (10) to the housing (20).

2. The resonator according to claim 1, wherein all the connecting lugs (14) are arranged at equal angles around a central axis of the main body (11).

3. The resonator according to claim 1, wherein the main body (11) is provided with an annular protrusion (16) at its bottom, the annular protrusion (16) being in close contact with a surface of the resonant cavity (21).

4. The resonator according to claim 3, wherein the resonant cavity (21) has a raised platform (22) at its bottom, the annular protrusion (16) being pressed against an upper surface of the raised platform (22).

5. The resonator according to claim 1, wherein the resonant cavity (21) is further provided with fixing platforms (23) at its bottom, the number of fixing platforms (23) corresponding to the number of connecting lugs (14), the fixing platforms (23) and the connecting lugs (14) being positionally aligned therewith, the threaded holes (231) being disposed inside the fixing platforms (23), the connecting lugs (14) resting on an upper surface of the fixing platforms (23), and the fixing members (12) passing through the connecting through-holes (15) and extending into the threaded holes (231).

6. The resonator according to claim 1, further comprising a tuning screw (50) and a nut (51), the tuning screw (50) passing through the cover plate (30) and extending into the resonant cavity (21) and the inner cavity (13), the nut (51) being located outside the cover plate (30) and connected to the tuning screw (50).

7. A filter, comprising a top cover (40) and at least one resonator according to claim 1, the top cover (40) being located above the cover plate (30) and sealingly connected to the housing (20).

8. The filter according to claim 7, wherein all the connecting lugs (14) are arranged at equal angles around a central axis of the main body (11).

9. The filter according to claim 7, wherein the main body (11) is provided with an annular protrusion (16) at its bottom, the annular protrusion (16) being in close contact with a surface of the resonant cavity (21).

10. The filter according to claim 9, wherein the resonant cavity (21) has a raised platform (22) at its bottom, the annular protrusion (16) being pressed against an upper surface of the raised platform (22).

11. The filter according to claim 7, wherein the resonant cavity (21) is further provided with fixing platforms (23) at its bottom, the number of fixing platforms (23) corresponding to the number of connecting lugs (14), the fixing platforms (23) and the connecting lugs (14) being positionally aligned therewith, the threaded holes (231) being disposed inside the fixing platforms (23), the connecting lugs (14) resting on an upper surface of the fixing platforms (23), and the fixing members (12) passing through the connecting through-holes (15) and extending into the threaded holes (231).

12. The filter according to claim 7, wherein the resonator further comprising a tuning screw (50) and a nut (51), the tuning screw (50) passing through the cover plate (30) and extending into the resonant cavity (21) and the inner cavity (13), the nut (51) being located outside the cover plate (30) and connected to the tuning screw (50).

13. The filter according to claim 7, wherein the filter is provided with at least one resonant unit (100), each resonant unit (100) comprising multiple resonators arranged in a single row or multiple rows;

wherein the housings (20) of all the resonators are integrally formed to constitute a casing (90) of the filter.

14. The filter according to claim 13, wherein each resonant unit (100) comprises an input structure (71) connected to external components, one end of a row of resonators is provided with an input isolation cavity (75), a first slit (77) is formed on a wall of the input isolation cavity (75), the input structure (71) passes through the input isolation cavity (75) and extends into an adjacent resonant cavity (21) via the first slit (77).

15. The filter according to claim 14, wherein each resonant unit (100) comprises an output structure (72) connected to external components, another end of a row of resonators is provided with an output isolation cavity (76), a second slit (78) is formed on a wall of the output isolation cavity (76), the output structure (72) passes through the output isolation cavity (76) and extends into an adjacent resonant cavity (21) via the second slit (78).

16. The filter according to claim 13, wherein the resonators of the resonant unit (100) are arranged in multiple rows, with a resonator in an upper row being located between two adjacent resonators in a lower row, a coupling window (73) and/or a coupling assembly (74) is provided on a wall of each resonant cavity (21).

* * * * *